United States Patent [19]
Harris et al.

[11] Patent Number: 5,827,804
[45] Date of Patent: Oct. 27, 1998

[54] BORATE CROSS-LINKED WELL TREATING FLUIDS AND METHODS

[76] Inventors: Phillip C. Harris, 2002 Woodrock Dr.; Michael A. McCabe, 1902 Windsor Dr.; Lewis R. Norman, 3408 W. Elk; Ronald J. Powell, 2612 Mantin La., all of Duncan, Okla. 73533; Chris E. Shuchart, 1821 Danfield Dr., Norman, Okla. 73073; Billy F. Slabaugh, Rt. #2, 485A, Marlow, Okla. 73055; John M. Terracina, 1004 Oakview Dr., Duncan, Okla. 73533; Joseph G. Yaritz, Rt. #2, Box 301, Marlow, Okla. 73055

[21] Appl. No.: 832,886

[22] Filed: Apr. 4, 1997

[51] Int. Cl.$^6$ ................ C09K 7/00; F21B 43/17
[52] U.S. Cl. .............. 507/273; 507/209; 507/239; 507/244; 507/904; 507/922; 166/308
[58] Field of Search .................. 507/215, 216, 507/922, 936, 904, 273, 239, 209, 244; 166/308

[56] References Cited

U.S. PATENT DOCUMENTS

| | | | |
|---|---|---|---|
| 3,058,909 | 10/1962 | Kern | 252/8.55 |
| 3,615,794 | 10/1971 | Nimerick | 106/208 |
| 3,743,613 | 7/1973 | Coulter, Jr. et al. | 260/17.4 |
| 3,974,077 | 8/1976 | Free | 252/8.55 R |
| 4,332,609 | 6/1982 | Ott | 71/27 |
| 4,514,309 | 4/1985 | Wadhwa | 507/216 |
| 4,560,486 | 12/1985 | Hinkel | 252/8.55 R |
| 4,627,495 | 12/1986 | Harris et al. | 166/280 |
| 5,160,445 | 11/1992 | Sharif | 252/8.551 |
| 5,372,732 | 12/1994 | Harris et al. | 507/217 |

FOREIGN PATENT DOCUMENTS

| | | |
|---|---|---|
| 2088435 | 9/1982 | United Kingdom . |
| WO8912157 | 12/1989 | WIPO . |

OTHER PUBLICATIONS

SPE Paper No. 24339 entitled "Chemistry and Rheology of Borate Crosslinked Fluids at Temperatures Up to 300° F" by Phillip C. Harris, Halliburton Services, presented at the SPE Rocky Mountain Regional/Low Permeability Reservoirs Symposium held in Casper, Wyoming, May 18–21, 1992.

*Primary Examiner*—Philip Tucker
*Attorney, Agent, or Firm*—Robert A. Kent; Clark Dougherty, Jr.

[57] ABSTRACT

The present invention provides borate cross-linked well treating fluids and methods of preparing and using the fluids in treating wells such as fracturing subterranean zones therein. The improved cross-linked treating fluids are basically comprised of water, a hydrated galactomannan gelling agent and a borate composition for buffering the treating fluid and cross-linking the hydrated galactomannan gelling agent comprised of water, a soluble boron source and an alkanolamine or alkylamine.

15 Claims, No Drawings

BORATE CROSS-LINKED WELL TREATING FLUIDS AND METHODS

BACKGROUND OF THE INVENTION

1. Field of the Invention

The present invention relates to improved cross-linked aqueous well treating fluids and methods of preparing and using such fluids for treating subterranean zones in wells.

2. Description of the Prior Art

High viscosity aqueous cross-linked gels are used in a variety of operations and treatments carried out in subterranean zones or formations including, but not limited to, well completion operations, fluid loss control treatments, production stimulation treatments, formation permeability conformance operations and treatments to reduce water production.

An example of a well completion operation involving the use of a high viscosity aqueous cross-linked gel is gravel packing. In gravel packing operations, solid gravel particles such as sand are carried to the subterranean zone or formation in which a gravel pack is to be placed by a high viscosity cross-linked gelled fluid. That is, the gravel is suspended in the high viscosity fluid at the surface and carried to the subterranean zone or formation in which the gravel pack is to be placed. Once the gravel is placed in the zone or formation, the cross-linked gel is broken (degraded) and returned to the surface. The gravel pack produced functions as a filter to separate formation solids from produced fluids while permitting the produced fluids to flow into and up the wellbore.

An example of a production stimulation treatment utilizing a high viscosity cross-linked gelled fluid is hydraulic fracturing. In hydraulic fracturing treatments, the high viscosity fluid is utilized as a fracturing fluid and also carries particulate propping agent, e.g., sand, into the fractures formed. That is, the fracturing fluid is pumped through the wellbore into a formation to be stimulated at a rate and pressure such that fractures are formed and extended in the formation. Propping agent is suspended in the fracturing fluid so that it is deposited in the fractures when the gel is broken and returned to the surface. The propping agent functions to prevent the formed fractures from closing whereby conductive channels are formed through which produced fluids can flow to the wellbore.

Borate ion has long been used as a cross-linking agent for forming high viscosity cross-linked gelled well treating fluids. Various sources of borate ion have been utilized including boric acid, borax, sodium tetraborate and proprietary compositions comprised of boric acid and dimers and trimers of borate ions. These solid materials which form or contain borate ion have varying solubilities in water and can cause operational problems when used as cross-linking agents in the preparation of high viscosity cross-linked gelled well treating fluids. For example, when the weather conditions are damp or wet, the solids tend to clump whereby they are difficult to meter into a gelled solution. While the solid materials are soluble in water, it is generally difficult to prepare a solution having a boron content in excess of about 2.5% by weight in a solution having a pH below about 13. When such solutions are prepared and used in cold weather, the solutions often crystallize making pumping and metering difficult.

Another problem involved in the preparation of high viscosity borate ion cross-linked gelled treating fluids has been the necessity of maintaining the pH of the fluids at a high level by the addition of a caustic solution thereto. That is, the pH of the fluid controls the equilibrium between boric acid and borate ion, the borate ion being the boron species which causes gelled aqueous fluids to cross-link. When the temperature of the fluid increases, the pH of the fluid decreases. Thus, the heretofore used borate cross-linked well treating fluids have been difficult to prepare as a result of temperature and/or pH changes. By elevating the pH of the gelled fluid, the borate ion concentration in the fluid is higher. At relatively high temperatures, the pH of the treating fluid must be very high in order to allow the treating fluid to be cross-linked using a moderate amount of the borate ion source. However, when the water utilized for forming the gelled fluid contains salts such as calcium and magnesium salts which are present in brines and seawater, calcium and magnesium salts are precipitated as the pH of the fluid is raised to the high level required to minimize the quantity of borate source necessary for cross-linking. The precipitation of the salts causes even greater amounts of caustic solution to be required. The use of caustic solution to raise the pH of a borate ion cross-linked well treating fluid and the necessity of including excess borate ion in the fluid to insure stability increases the cost and complexity of the fluid and the well treatment performed using the fluid.

Thus, there is a need for improved, stable, high viscosity, borate cross-linked gelled aqueous well treating fluids, improved methods of preparing such fluids and improved methods of using such fluids for treating subterranean zones or formations in wells.

SUMMARY OF THE INVENTION

The present invention provides improved, stable borate cross-linked gelled aqueous well treating fluids as well as improved methods of using and preparing such fluids which meet the needs described above and overcome the deficiencies of the prior art. The stable borate cross-linked well treating fluids of the invention are basically comprised of water, a hydrated galactomannan gelling agent and a borate composition comprised of water, a boron source and an alkanolamine or alkylamine. The galactomannan gelling agent is present in the aqueous treating fluid in an amount in the range of from about 0.06% to about 0.72% by weight of water therein. The borate buffering and cross-linking composition is present in the treating fluid in an amount in the range of from about 0.1% to about 0.8% by weight of water therein.

The borate buffering and cross-linking composition useful in accordance with the present invention is comprised of water in an amount in the range of from about 96% to about 5% by weight of the composition, boron (as boric acid) in an amount in the range of from about 3% to about 82% by weight of the composition and an alkanolamine or alkylamine present in an amount in the range of from about 1% to about 13% by weight of the composition. The alkanolamine is preferably an ethanolamine, most preferably monoethanolamine.

The methods of using the improved stable borate cross-linked well treating fluids of this invention are basically comprised of the steps of preparing such a treating fluid and then pumping the treating fluid into a subterranean zone or formation penetrated by a wellbore.

The methods of preparing the improved, stable borate cross-linked well treating fluids of this invention are basically comprised of the steps of dissolving a galactomannan gelling agent in water to form a gelled aqueous fluid, and then combining the borate buffering and cross-linking composition of this invention with the gelled aqueous fluid.

It is, therefore, a general object of the present invention to provide improved stable borate cross-linked well treating fluids and methods.

Other and further objects, features and advantages of the present invention will be readily apparent to those skilled in the art upon a reading of the description of preferred embodiments which follows.

DESCRIPTION OF PREFERRED EMBODIMENTS

The improved, stable borate cross-linked gelled aqueous well treating fluids of this invention are simple and inexpensive to prepare in that they can be mixed and pumped at low as well as high temperatures without the need for additional components. The treating fluids are made up of fewer separate chemicals and can be readily prepared using batch mixing procedures or on-the-fly procedures. The treating fluids have lower pH levels and utilize less polymer than borate cross-linked well treating fluids used heretofore. Because of the lower pH, the treating fluids are more compatible with enzyme breakers and because of the low polymer levels in the treating fluids, better returns from treated subterranean formations are obtained. In addition to being less costly, the treating fluids of this invention provide more viscosity with less polymer and improved proppant transport capacity than the heretofore utilized borate cross-linked treating fluids.

The improved, stable borate cross-linked gelled aqueous well treating fluids of this invention are basically comprised of water, a hydrated galactomannan gelling agent and a borate composition for buffering the treating fluids and cross-linking the hydrated galactomannan gelling agent therein. The borate buffering and cross-linking composition is comprised of water, a boron source and an alkanolamine or alkylamine.

The water utilized to form the improved borate cross-linked well treating fluids of this invention can be fresh water, salt water, sea water, brine or any other aqueous liquid which does not adversely react with other components of the treating fluid. The water used in well treating fluids normally contains one or more salts for inhibiting the swelling of clays in the subterranean formations or zones being treated or to weight the treating fluid. The most common clay inhibiting salt utilized is potassium chloride, but other salts can also be used. The pH of the water is preferably in the range of from about 6.0 to about 8.5 to facilitate the hydration of the galactomannan gelling agent utilized.

The galactomannan gelling agents which can be used in accordance with the present invention are the naturally occurring gums and their derivatives such as guar, locust bean, tara, honey locust, tamarind, karaya, tragacanth, carrageenan and the like. These gums are generally characterized as containing a linear backbone consisting of mannose units having various amounts of galactose units attached thereto. The gums can also be characterized as having one or more functional groups such as cis-hydroxyl, hydroxyl, carboxyl, sulfate, sulfonate, amino or amide. Of the various galactomannan gelling agents which can be utilized, one or more gelling agents selected from the group of guar, hydroxyethylguar, hydroxypropylguar, carboxymethylguar, carboxymethylhydroxyethylguar and carboxymethylhydroxypropylguar are preferred. Of these, guar is the most preferred.

When one or more of the above mentioned galactomannan gelling agents are dissolved in water, the gelling agents are hydrated and a viscous aqueous gel is formed. In accordance with this invention, the galactomannan gelling agent or agents utilized are dissolved in the water in an amount in the range of from about 0.06% to about 0.72% by weight of the water, more preferably in an amount in the range of from about 0.12% to about 0.36%, most preferably about 0.30%.

As mentioned above, a borate composition for buffering the treating fluid and cross-linking the hydrated galactomannan gelling agent in the treating fluid is combined therewith. The borate buffering and cross-linking composition is a liquid solution generally comprised of water, a soluble boron source such as boric acid and an alkanolamine or alkylamine. The water utilized in forming the borate composition is preferably fresh water, but other aqueous liquids can be utilized so long as they do not adversely react with or otherwise affect other components of the borate composition or the treating fluid formed therewith. The water can include one or more freezing point depressants such as ethylene glycol, propylene glycol, alcohols or the like to prevent the borate composition from freezing in cold weather. Preferably, ethylene glycol is combined with the water used in an amount of 50% by weight of the resulting solution which depresses the freezing point of the borate composition to less than about −20° F. The term "water" when used hereinbelow relating to the borate composition means water or other suitable aqueous liquid with or without one or more freezing point depressants dissolved therein. The water is preferably present in the borate composition in an amount in the range of from about 96% to about 5% by weight of the composition, most preferably about 60%.

The boron source can comprise substantially any boron containing compound capable of yielding borate in a solution maintained at a pH above about 7. The boron source can be provided by, for example, boric acid, boric oxide, pyroboric acid, metaboric acid, borax, sodium tetraborate and the like. For simplicity, reference will hereinafter be made to borate or boron content as boric acid or boric acid equivalents. That is, if a weight percentage is specified for boron content as boric acid, it is to be understood that a chemically equivalent amount of, for example, borax or sodium tetraborate could be substituted for the boric acid.

The boron source is preferably present in the buffering and cross-linking composition in an amount as boric acid in the range of from about 3% to about 82% by weight of the composition, most preferably in an amount of about 30%.

A variety of alkanolamines or alkylamines can be utilized in the borate buffering and cross-linking composition, but the quantity of boron in the composition is reduced as the molecular weight of the amine included in the composition increases. Thus, it is preferred that a relatively low molecular weight alkanolamine be used such as an ethanolamine. The most preferred low molecular weight alkanolamine is mono-ethanolamine. The use of a low molecular weight alkanolamine in the borate composition produces the further benefit of making the composition cold weather stable, i.e., the composition without a freezing point depressant therein does not crystallize or the like at low temperatures down to about 5° F. Other suitable alkanolamines include diethanolamine, 1-amino-2-propanol, 1amino-2-butanol and the like. The alkylamines can comprise an aliphatic polyamine such as, for example, ethylenediamine, diethylenetriamine, triethylenetetraamine, 1,2-diaminopropane, tetraethylenepentamine and the like. The alkanolamine or alkylamine is generally present in the cross-linking and buffering composition, in an amount in the range of from about 1% to about 13% by weight of the composition. When mono-ethanolamine is utilized, it is preferably present in the composition in an amount of about 10% by weight of the composition.

A particularly preferred highly concentrated, stable cross-linking and buffering composition useful in accordance with this invention is comprised of water present in an amount of about 60% by weight of the composition, boron calculated as boric acid present in an amount of about 30% by weight of the composition and mono-ethanolamine present in an amount of about 10% by weight of the composition. This composition is stable and is easily pumped and metered at low temperatures. The borate ion concentration in the composition is very high, and the composition has the ability to buffer the resulting treating fluid to a pH between about 8.4 and 9 without the need for any other chemicals such as caustic, sodium carbonate or other buffer. Because the pH of the treating fluid is below 9.2, calcium and magnesium salts remain in solution.

Surprisingly, it has been found that the crosslinking composition of the present invention can provide a boron content, as determined by an Inductive Coupled Plasma Spectrometer analysis, in excess of 2.6 percent by weight of the composition in contrast to prior art compositions which comprise no more than about 2.5 percent boron. Preferably, the boron content is in excess of about 4.5 percent by weight and most preferably above about 6 percent by weight of the composition while the pH of the composition remains below about 13.

The cross-linking and buffering composition comprised of water, a boron source and alkanolamine or alkylamine is present in the improved, stable borate cross-linked gelled aqueous well treating fluids of this invention in an amount in the range of from about 0.05% to about 0.8% by weight of water in the treating fluids, preferably in an amount in the range of from about 0.15% to about 0.4%.

A particularly preferred stable, highly viscous, borate cross-linked gelled aqueous well treating fluid of this invention is comprised of water, hydrated guar present in an amount of about 0.30% by weight of the water and the preferred borate composition for buffering the treating fluid and cross-linking the hydrated guar comprised of water, boric acid and mono-ethanolamine described above present in the treating fluid in an amount of about 0.2% by weight of the water.

As will be well understood by those skilled in the art, a variety of conventional additives can be included in the well treating fluids of this invention such as gel stabilizers, gel breakers, clay stabilizers, bactericides, fluid loss additives and the like which do not adversely react with the treating fluids or prevent their use in a desired manner.

The improved methods of the present invention for treating a subterranean zone penetrated by a wellbore are basically comprised of the steps of preparing a stable, high viscosity, borate ion cross-linked gelled aqueous treating fluid of this invention and then pumping the treating fluid into the subterranean zone. While the improved treating fluids of this invention can be utilized for performing any of the various well treatments mentioned above, the treating fluids are particularly well suited for performing fracture stimulation treatments. In such treatments, a high viscosity, well treating fluid is pumped through the wellbore into the subterranean zone or formation to be fractured at a high rate and pressure whereby fractures are formed in the subterranean zone or formation and propping agent, such as sand, suspended in the treating fluid is carried into the fractures and deposited therein. Thereafter, the treating fluid is caused to break, i.e., revert to a thin fluid which can be reverse flowed out of the fractures leaving the proppant therein.

The methods of preparing the stable, highly viscous, borate cross-linked gelled aqueous treating fluids of this invention are basically comprised of the steps of dissolving a galactomannan gelling agent in water to form a gelled aqueous fluid and then combining the borate buffering and cross-linking composition of this invention therewith. The galactomannan gelling agent is dissolved in the water utilizing conventional mixing and pumping equipment to form a gelled aqueous fluid, i.e., an aqueous solution of hydrated gelling agent. Thereafter, the liquid borate composition is combined with the gelled aqueous fluid. As is well understood by those skilled in the art, the liquid cross-linking composition can be combined with the gelled aqueous fluid on-the-fly. That is, the liquid borate composition can be pumped and metered into the gelled aqueous fluid as the gelled aqueous fluid is pumped into the wellbore.

In order to further illustrate the compositions and methods of the present invention, the following examples are given.

EXAMPLE 1

A highly concentrated boron composition was prepared in the laboratory comprised of 1.24 moles of water (5% by weight), 6 moles of boric acid (82% by weight) and 1 mole of mono-ethanolamine (13% by weight). The water was added to the mono-ethanolamine and stirred for 1 minute followed by the addition of the boric acid with stirring during the ensuing exothermic reaction.

The resulting liquid composition having a boron content of about 15 percent by weight was very stable and had a pour point of 5° F. An aqueous solution containing 50% by weight ethylene glycol is substituted for the water, the resulting borate composition has a freezing point of less than 0° F.

A second concentrated composition was prepared in the laboratory comprised of 30 percent by weight boric acid, 10 percent by weight mono-ethanolamine and 60 percent by weight of a 50/50 solution of water and ethylene glycol.

The resulting liquid composition having a boron content of about 6 percent by weight was very stable and had a pour point of below −25° F.

EXAMPLE 2

A stimulation treatment was performed using a treating fluid of the present invention comprised of fresh water containing 1% by weight of potassium chloride, guar gelling agent present in the treating fluid in an amount of 25 pounds per 1,000 gallons of water (0.30% by weight of water), and a borate composition for buffering the treating fluid and cross-linking the gelling agent present in an amount of 2 gallons per 1,000 gallons of water (0.2% by weight of water). The borate composition was comprised of a fresh water solution containing 50% by weight ethylene glycol present in an amount of 60%, boric acid present in an amount of 30% and mono-ethanolamine present in an amount of 10%, all by weight of the borate composition.

The treated formation had a temperature of 95° F. and was at a depth of from 2,436 to 2,520 feet. The stimulation treatment included perforating the producing interval, acidizing the perforations and then fracturing the formation. 49,000 gallons of the treating fluid were pumped during the fracturing treatment and 2,000 sacks (100 lbs./sack) of 12/20 Brady sand (propping agent) were placed in the fractures.

The treatment was successful and the following was observed concerning the treating fluid used.

1. The treating fluid was clear and stable.
2. The treating fluid had excellent propping agent suspension capabilities, e.g., a sample of the treating fluid containing 10 pounds per gallon of the 12/20 Brady sand indicated no settling.

3. The treating fluid was very simple to prepare as compared to prior art borate cross-linked fluids commonly used in the area which required the use of more chemicals such as caustic and buffers.

4. The treating fluid had a higher viscosity than the prior art fluids at the same gelling agent concentration indicating less gelling agent could be used.

Thus, the present invention is well adapted to carry out the objects and attain the benefits and advantages mentioned as well as those which are inherent therein. While numerous changes to the compositions and methods can be made by those skilled in the art, such changes are encompassed within the spirit of this invention as defined by the appended claims.

What is claimed is:

1. A method of fracturing a subterranean formation comprising:

hydrating a galactomannan gelling agent in water to form a gelled aqueous fluid;

admixing said gelled aqueous fluid with a buffering and crosslinking composition consisting essentially of from about 1 to about 13% by weight of the composition of an alkanolamine or alkylamine, from about 26 to about 82% by weight of the composition of boron (calculated as boric acid) and from about 5 to about 73% by weight of the composition of water and an optional freezing point depressant whereby said gelled aqueous fluid is caused to be buffered to a pH in the range of from about 8.4 to about 9 without the need for additional buffering agents and subsequently crosslinked by the borate ion present;

introducing said buffered crosslinker-containing gelled fluid into a subterranean formation at a rate and pressure whereby fractures are formed in the subterranean formation;

introducing a propping agent into said fractures suspended in said buffered crosslinker-containing gelled fluid; and depositing, at least a portion of said propping agent in said created fractures.

2. The method of claim 1, wherein said galactomannan gelling agent is selected from the group consisting of guar, hydroxyethylguar, hydroxypropylguar, carboxymethylguar, carboxymethylhydroxyethylguar, carboxymethylhydroxypropylguar and mixtures thereof.

3. The method of claim 1 wherein said galactomannan gelling agent is guar.

4. The method of claim 1 wherein said alkanolamine or alkylamine comprises at least one member selected from the group of mono-ethanolamine, diethanolamine, 1-amino-2-propanol, 1-amino-w-butanol, ethylenediamine, 1,2-diamino-propane, diethylenetriamine, triethylenetetraamine and tetraethylenepentamine.

5. The method of claim 1 wherein said alkanolamine is mono-ethanolamine.

6. A method of fracturing a subterranean formation comprising:

hydrating a galactomannan gelling agent in water having a pH in the range of from about 6 to about 8.5 to form a gelled aqueous fluid;

admixing said gelled aqueous fluid with a buffering and crosslinking composition consisting essentially of from about 1 to about 13% by weight of the composition of an alkanolamine or alkylamine comprising at least one member selected from the group of mono-ethanolamine, diethanolamine, 1-amino-2-propanol, ethylenediamine, diethylenetriamine and 1,2-diaminopropane, from about 26 to about 82% by weight of the composition of boron (calculated as boric acid) and from about 5 to about 73% by weight of water and a freezing point depressant whereby said gelled aqueous fluid is caused to be buffered to a pH in the range of from about 8.4 to about 9 without the need for additional buffering agents and subsequently crosslinked by the borate ion present;

introducing said buffered gelled aqueous fluid into a subterranean formation while crosslinking is occurring at a rate and pressure sufficient to create at least one fracture in said subterranean formation; and extending said created fracture into said subterranean formation by continued pumping of said buffered gelled aqueous fluid.

7. The method of claim 6 wherein said galactomannan gelling agent is selected from the group consisting of guar, hydroxyethylguar, hydroxypropylguar, carboxymethylguar, carboxymethylhydroxyethylguar, carboxymethylhydroxypropylguar and mixtures thereof.

8. The method of claim 6 wherein said galactomannan gelling agent is guar.

9. The method of claim 6 wherein said alkanolamine is mono-ethanolamine.

10. A method of fracturing a subterranean formation comprising:

hydrating a galactomannan gelling agent in water having a pH in the range of from about 6.0 to about 8.5 to form a gelled aqueous fluid;

admixing said gelled aqueous fluid with a buffering and crosslinking composition consisting essentially of about 10% by weight of the composition of monoethanolamine, about 30% by weight of the composition of boron (calculated as boric acid) and about 60% by weight of water and an optional freezing point depressant whereby said gelled aqueous fluid is caused to be buffered to a pH in the range of from about 8.4 to about 9 without the use of additional buffering agents and subsequently crosslinked by the borate ion present;

introducing said buffered fluid into a subterranean formation at a rate and pressure sufficient to create at least on fracture in said formation;

admixing a quantity of a propping agent with a quantity of said buffered fluid whereby said propping agent is suspended in said buffered fluid;

introducing at least a portion of said suspended proppant into the fracture created in said subterranean formation; and breaking said buffered gelled aqueous fluid and depositing at least a portion of said suspended proppant in said created fracture into which it was introduced.

11. The method of claim 10 wherein said galactomannan gelling agent is present in an amount of from about 0.06% to about 0.72% by weight of said water.

12. The method of claim 10 wherein said galactomannan gelling agent is guar.

13. The method of claim 10 wherein said buffering and crosslinking composition is combined with said gelled aqueous fluid in an amount in the range of from about 0.12 to about 0.36% by weight of said water.

14. The method of claim 10 wherein said freezing point depressant is present in an amount of about 30% by weight of said buffering and crosslinking composition.

15. The method of claim 14 wherein said freezing point depressant comprises at least one member selected from the group of ethylene glycol, propylene glycol and alcohol.

* * * * *